(12) United States Patent
Senarath et al.

(10) Patent No.: US 6,778,499 B1
(45) Date of Patent: Aug. 17, 2004

(54) METHOD AND APPARATUS FOR ENABLING THE SMOOTH TRANSMISSION OF BURSTY DATA IN A WIRELESS COMMUNICATIONS SYSTEM

(75) Inventors: Nimal G. Senarath, Nepean (CA); Parsya R. Larijani, Ottawa (CA); Adnan Abu-Dayya, Redmond, WA (US)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/335,746

(22) Filed: Jun. 18, 1999

(51) Int. Cl.[7] .............................................. H04L 12/26
(52) U.S. Cl. ...................... 370/232; 370/429; 370/465
(58) Field of Search ............................... 370/545, 543, 370/412, 413, 414, 230.1, 229, 230, 231, 232, 445, 446, 428, 429, 465, 335, 342

(56) References Cited

U.S. PATENT DOCUMENTS

| | | | | |
|---|---|---|---|---|
| 4,839,891 A | * | 6/1989 | Kobayashi et al. | |
| 4,901,277 A | * | 2/1990 | Soloway et al. | ............ 709/233 |
| 4,970,720 A | * | 11/1990 | Esaki | |
| 5,132,964 A | * | 7/1992 | Esaki | |
| 5,210,829 A | * | 5/1993 | Bitner | |
| 5,255,090 A | * | 10/1993 | Israelsen | |
| 5,623,483 A | * | 4/1997 | Agrawal et al. | ............ 370/253 |
| 5,818,818 A | * | 10/1998 | Soumiya et al. | |
| 5,936,939 A | * | 8/1999 | Des Jardins et al. | |
| 5,974,033 A | * | 10/1999 | Kamiya et al. | |
| 5,983,278 A | * | 11/1999 | Chong et al. | |
| 6,044,396 A | * | 3/2000 | Adams | |
| 6,061,399 A | * | 5/2000 | Lyons et al. | |
| 6,101,176 A | * | 8/2000 | Honkasalo et al. | |
| 6,212,582 B1 | * | 4/2001 | Chong et al. | |
| 6,229,812 B1 | * | 5/2001 | Parruck et al. | |
| 6,327,476 B1 | * | 12/2001 | Koscal | |
| 6,424,624 B1 | * | 7/2002 | Galand et al. | |

* cited by examiner

Primary Examiner—Kwang Bin Yao

(57) ABSTRACT

A method and apparatus for smoothing bit rate transitions in a bursty input data stream. The method includes the steps of receiving the input data stream in a buffer, periodically measuring the occupancy level of the buffer and withdrawing the contents of the buffer at an output rate. In a simple embodiment of the invention, the output rate is increased if the buffer occupancy level is above a threshold occupancy level and decreased if the buffer occupancy level is below a second threshold intensity, where both threshold occupancy levels are dependent on the current output rate. The output rate is made dependent on the buffer occupancy level, which allows the output data stream to have smoother data rate transitions than does the input data stream. As a result, there is little degradation of service quality to other users of the system upon establishing the bursty connection and problems related to convergence of power levels across the entire system are practically eliminated. Furthermore, power amplifier requirements in the transmitter may be relaxed, which can prevent outages of the high-speed link itself. Also, since there are fewer abrupt changes in the output rate, there will be fewer abrupt changes in the induced interference, leading to a higher percentage of call admissions which are retained and hence the capacity is increased.

28 Claims, 2 Drawing Sheets

METHOD AND APPARATUS FOR ENABLING THE SMOOTH TRANSMISSION OF BURSTY DATA IN A WIRELESS COMMUNICATIONS SYSTEM

FIELD OF THE INVENTION

The present invention relates to communications systems in general and, more particularly, to a method and apparatus for smoothly transmitting bursty data in a wireless communications system.

BACKGROUND OF THE INVENTION

Existing CDMA (code-division multiple access) systems based on TIA/EIA standard IS-95 support the transmission of digital information at rates of up to 9.6 kbps or at most 14.4 kbps per channel. However, these data rates are considered to be insufficient for supporting many emerging data transfer applications, including browsing of the World Wide Web, electronic mail, e-commerce, tele-medicine and the like. With the goal of providing greater flexibility in the delivery of data services while continuing to exploit the features and merits of a CDMA-based system, various North American, European and Japanese consortia have developed proposals for what has become known as third generation (3G) CDMA.

As a consequence of 3G CDMA being able to support a wide range of data rates, links having different data rates may vary considerably in the power they consume. For example, to maintain the same quality of service for a 384 kbps link, approximately 16 dB more power is required than for a 9.6 kbps link. (The latter is typical of the bit rate of a standard voice channel in both IS-95 and 3G CDMA, while the former is typical of the bit rate that has been proposed for use by high-speed data channels in 3G CDMA.) Thus, the abrupt start of a 384 kbps transmission is roughly equivalent to the simultaneous origination of 40 voice calls.

The interference caused by establishing high-speed data connections depends on various factors, such as the cell(s) in which users are located, the direction of communication (forward-link or reverse-link) and the cell loading. By way of illustration, let there be a high-speed link established between a first mobile unit and a base station in a cell C1. If a second mobile unit is also located in cell C1 and if the first mobile unit's high-speed connection is in the forward-link direction, then very little interference will be felt by the second mobile unit, due to mutual orthogonality of the signals transmitted by the base station in cell C1.

On the other hand, if the second mobile unit is located in a cell C2 which borders with cell C1 and if the first mobile unit's high-speed connection has been established in the reverse-link direction, then factors such as the loading of cell C2 and the proximity of the second mobile unit to the boundary of cell C1 will determine the level of interference felt by the second mobile unit. This can range from very mild (when cell C2 is heavily loaded and the second mobile unit is far away from the boundary between cells C1 and C2) to very severe (when cell C2 has very few active calls and the second mobile unit is proximate the boundary between cells C1 and C2).

An increase in the interference felt by other users (e.g., the second mobile unit in the above example) results in a degradation in the quality of service of the connections established by those other users. Consequently, the transmitted power of the affected links will be increased using standard power control algorithms until an acceptable quality of service is again attained. However, the other users may not be able to increase their power levels quickly enough, which may result in data being lost or delayed in the meantime.

Furthermore, even if the other users are capable of raising their power levels quickly, a certain amount of time will elapse before stable power levels are arrived at by the various users. This is due to the fact that when link power is increased to satisfy any one user, interference will be caused to the remaining users, who then have to raise their respective link power, thereby affecting the user who originally required an increase in link power, and so on. This chain reaction continues until all users reach a stable power level but in the meantime, some users may experience a lower signal quality than required. Depending on the degree of burstiness of the high-speed data, such chain reactions may be initiated many times per second and thus the power levels may not be given a chance to converge.

Even more fundamentally, the interference caused by a bursty high-speed data transfer involving a particular user will tend to decrease during gaps between bursts. During such gaps, additional calls may be admitted by the system controller. However, the admission of calls based on a low interference level at the time of admission may cause signal degradations to occur when the high-speed link becomes active at a later time, e.g., during a subsequent burst.

Moreover, if the quality requirement for the high-speed link is greater than that for voice, the impact of turning on that high-speed link is even more dramatic. Similarly, the effects of interference are magnified when multiple high-speed links are established.

Clearly, a major problem facing the developers of 3G CDMA systems is that of addressing or tempering the sudden interference changes resulting from the bursty nature of high-speed data transmissions.

SUMMARY OF THE INVENTION

The invention may be summarized according to a first broad aspect as a method of smoothing the bit rate transitions in a bursty input data stream. The method includes the steps of receiving the input data stream in a buffer, periodically measuring the occupancy level of the buffer and withdrawing the contents of the buffer at an output rate. The output rate is made dependent on the buffer occupancy level, which allows the output data stream to have smoother data rate transitions than does the input data stream.

In a simple embodiment of the invention, the output rate is increased if the buffer occupancy level is above a threshold occupancy level and decreased if the buffer occupancy level is below a second threshold level, where both threshold occupancy levels are dependent on the current output rate.

In the preferred embodiment of the invention, the output rate is increased if any of the following is true: (1) the most recent change to the output rate was a decrease AND the buffer occupancy level is above a first threshold occupancy level dependent on the current output rate; (2) the most recent change to the output rate was an increase AND a predetermined amount of time dependent on the output rate has elapsed since the most recent change to the output rate AND the buffer occupancy level is above a second threshold occupancy level dependent on the output rate; (3) the output rate is initially at a predetermined minimum value AND the buffer occupancy level is above a third threshold occupancy level.

Analogously, the output rate is preferably decreased if any of the following conditions is met: (1) the most recent change to the output rate was an increase AND a first predetermined amount of time dependent on the output rate has elapsed since the most recent change to the output rate AND the buffer occupancy level is below a first threshold occupancy level dependent on the current output rate; (2) the most recent change to the output rate was a decrease AND a second predetermined amount of time dependent on the output rate has elapsed since the most recent change to the output rate AND the buffer occupancy level is below a second threshold occupancy level dependent on the output rate; (3) the output rate is at a predetermined maximum value AND the buffer occupancy level is below a third threshold occupancy level.

According to another broad aspect, the invention may be summarized as a data rate smoothing unit. The smoothing unit has a buffer for receiving a bursty input data stream and a processing unit connected to the buffer, for withdrawing data from the buffer at a controllable output rate. The buffer is operable to periodically measure its occupancy level. The smoothing unit also has a controller connected to the buffer and to the processing unit. The controller is operable to vary the output rate as a function of the occupancy level to provide an output data stream with a less bursty nature than the input data stream.

The invention may be summarized according to yet another broad aspect as a CDMA transmission system having a data source, a bit rate control module, a data channel encoder and a controller. The data source provides an input data stream consisting of data bursts. The bit rate control module receives the input data stream and is operable to periodically measure the occupancy level of the buffer. The data channel encoder is connected to the bit rate control module and withdraws from it an output data stream at a controllable output rate and performs error correction on the output data stream. Finally, the controller is connected to the bit rate control module and to the data channel encoder, and is operable to vary the output rate as a function of the comparison of the occupancy level to a threshold occupancy level, resulting in the output data stream having fewer bursts than the input data stream.

A transmitter may also be provided in the transmission system, for scaling the output of the data channel encoder in accordance with a controllable output power level. This output power level is set by the controller and is preferably proportional to the output rate. The transmitter may also be equipped with modules for performing pseudo-random noise spreading of the control signal and the output of the data channel encoder, combining the spread signals into a composite signal, amplifying the composite signal and transmitting the amplified signal over a wireless link.

The transmission system may be part of either a mobile unit or a base station. If it is part of a base station, there may be an individual system for each of a plurality of users, running in parallel with one another.

As a result of smoothing the bursty data stream, there is little degradation of service quality to other users of the system upon establishing the bursty connection and problems related to convergence of power levels across the entire system are practically eliminated. Furthermore, power amplifier requirements in the transmitter may be relaxed, which can prevent outages of the high-speed link itself. Also, since there are fewer abrupt changes in the output rate, there will be fewer abrupt changes in the induced interference, leading to a higher percentage of call admissions which are retained and hence the capacity is increased.

BRIEF DESCRIPTION OF THE DRAWINGS

These and other aspects and features of the present invention will become apparent to those of ordinary skill in the art upon review of the following description of specific embodiments of the invention in conjunction with the accompanying drawings, in which.

DETAILED DESCRIPTION OF THE PREFERRED EMBODIMENT

Figure 1:
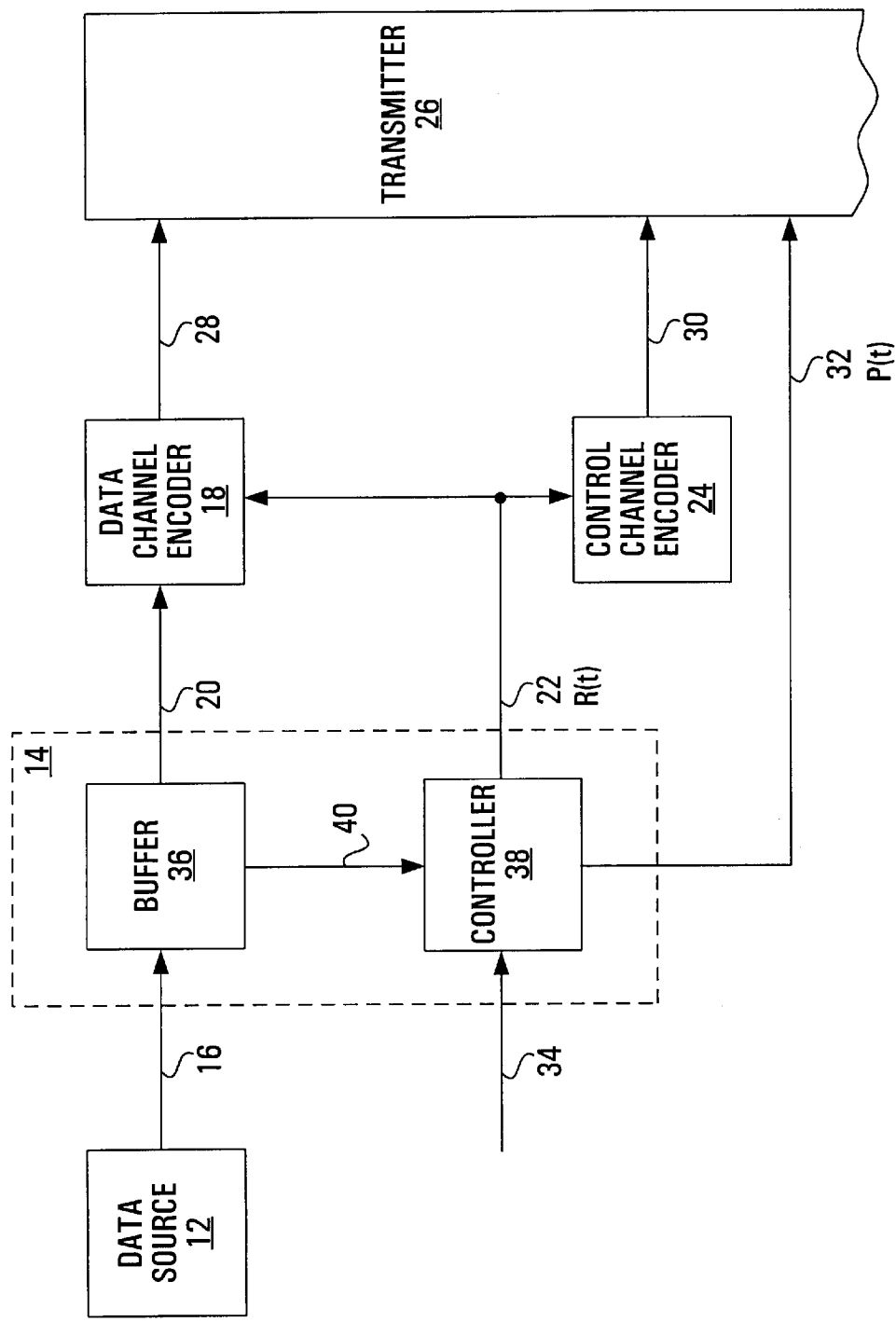
FIG. 1 shows in schematic form the preferred embodiment of the present invention, including a bit rate control module having a buffer and a controller.

Referring to FIG. 1, there is shown a CDMA transmission system 10 in accordance with the preferred embodiment of the present invention. The system comprises a data source 12 for producing a digital data stream associated with one or more users. The data source 12 may be a vocoder, a portable digital data interface, a computer terminal, a network server or the like. The data stream produced by the data source 12 is typically bursty in nature, with a bit rate that varies in time between a minimum bit rate $R_{MIN}$ and a maximum bit rate $R_{MAX}$ and possibly one or more intermediate bit rates. A data link 16 carries the bursty data stream to a bit rate control module 14. Not shown are various packetizing and formatting stages which may have to be applied to the bursty data stream between the data source 12 and the bit rate control module 14.

The bit rate control module 14 comprises a buffer 36 connected via a control link 40 to a controller 38. The input to the buffer 36 is the bursty data stream received from the data source 12 along data link 16. The buffer 36 comprises circuitry or software for temporarily queueing the bits in the bursty data stream and for measuring the buffer occupancy level, i.e., the length of the queue. The outputs of the buffer 36 are a smoothed data stream supplied to a data channel encoder 18 along another data link 20 and the measured buffer occupancy level, denoted $L_{BUF}(t)$, which is provided to the controller 38 along control link 40. The buffer 36, the controller 38 and those processing units of the data channel encoder 18 which accept bits from the buffer 36 as a function of $L_{BUF}(t)$ can be called a data rate smoothing unit.

In addition to accepting the buffer occupancy level $L_{BUF}(t)$, the controller 38 accepts a plurality of system parameters from a central processing unit (not shown) along a control link 34. The system parameters are dependent on the system implementation and/or on the service being delivered. The values of the system parameters may be selected by a human operator or may be automatically looked up by the central processing unit (not shown) at the start of service delivery.

The controller 38 in the bit rate control module 14 is preferably a software entity although it can also be implemented as a stand-alone hardware or firmware component, such as an application-specific integrated circuit (ASIC), a programmable logic device (PLD) or a digital signal processor (DSP). Alternatively, the controller 38 may be a general purpose computer capable of reading a storage medium, such as a disk, which contains instructions for controlling the controller 38.

Regardless of the form in which it is implemented, the controller 38 follows a sequence of steps for processing the buffer occupancy level $L_{BUF}(t)$ and the system parameters in order to generate a signal indicative of a desired output rate, denoted R(t), and a signal indicative of a desired output power level, denoted P(t). The signal carrying the desired output rate R(t) is supplied to the data channel encoder 18 and to a control channel encoder 24 along a control link 22. The signal carrying the desired output power level P(t) is provided to a transmitter 26 along a control link 32.

The data channel encoder 18 is preferably a software entity which may in fact be integrated with the bit rate control module 14. Of course, other implementations in firmware, hardware or software are possible. The encoder 18 is operable to withdraw bits from the buffer 36 according to the desired output rate R(t) received from the controller 38 along control link 22, resulting in the generation of the smoothed data stream on data link 20. The data channel encoder 18 also comprises functional units for performing error correction encoding of the smoothed data stream so produced. The resulting encoded smoothed data stream is supplied to the transmitter 26 along a data link 28.

The control channel encoder 24 is also preferably a software entity which may be integrated with the data channel encoder 18 and/or the bit rate control module 14. The control channel encoder 24 encodes the desired output rate R(t) (received from the controller 38 along control link 22) and provides the encoded value of the desired output rate to the transmitter 26 along a data link 30. In this way, an intended recipient can be made aware of instantaneous changes in the bit rate of the smoothed data stream.

The transmitter 26 comprises circuitry or software for scaling the amplitude of each bit in the encoded smoothed data stream received from the data channel encoder 18 on data link 28 in accordance with the desired output power level P(t) received from the controller 38 via control link 32. In addition, the transmitter 26 is equipped with circuitry for orthogonally modulating and transmitting both the scaled encoded smoothed data stream and the encoded desired output rate R(t) to the intended recipient across an air interface.

In a forward-link scenario, the transmission system 10 will be part of a base station and there will generally be one buffer, one data channel encoder and one control channel encoder for each of a plurality of mobile units serviced by the base station. The controllers may be distributed or integrated into a centralized unit. In a reverse-link scenario, there will typically be one transmission system 10 per mobile unit, with a single buffer, a single data channel encoder and a single control channel encoder. In either the forward-link or reverse-link scenarios, there may be additional encoders (not shown) connected to the transmitter 26 and associated with each data source 12, for supporting extra channels such as pilot, access or paging channels. Furthermore, the data source 12 itself may provide multiplexing of data destined for multiple users sharing a communications link.

In operation, the bursty data stream generated by the data source 12 enters the buffer 36 along data link 16. The buffer 36 monitors its occupancy level at regular intervals and periodically provides the buffer occupancy level $L_{BUF}(t)$ to the controller 38 via control link 40. Based upon the buffer occupancy level $L_{BUF}(t)$, the controller 38 may or may not change the desired output rate R(t) and the desired output power level P(t). Generation of the desired output rate R(t) as a function of the buffer occupancy level $L_{BUF}(t)$ will be considered in greater detail herein below.

Meanwhile, the data channel encoder 18 withdraws bits from the buffer 36 along data link 20 in accordance with the desired output rate R(t). As will be shown, the resulting data stream processed by the data channel encoder 18 has fewer abrupt transitions than the data stream entering the buffer along data link 16. The data channel encoder 18 performs error correction encoding of the smoothed data stream and feeds the encoded smooth data stream to the transmitter 26 along data link 28.

Working in parallel with the data channel encoder 18, the control channel encoder 24 encodes the desired output rate R(t), which happens to be the actual data rate being drawn by the data channel encoder 18, into the signal that is fed to the transmitter 26 along data link 30. At the transmitter 26, both streams arriving on data links 28, 30 are orthogonally modulated and otherwise readied for transmission to the intended recipient in a known way. If other encoders are provided, then their output streams are similarly processed by the transmitter 26.

In addition, the transmitter 26 applies scaling of the encoded smoothed data stream in accordance with the desired output power level P(t). Typically, the desired output power level P(t) will be proportional to the desired output rate R(t), but scaled to fall within the range required by the transmitter 26. Alternatively, the desired output rate R(t) could be provided directly to the transmitter 26 instead of a separate desired output power level P(t). In this case, scaling of the encoded smoothed data stream by the transmitter 26 would take into account the range of the desired output rate R(t) supplied by the controller 38.

Figure 2:
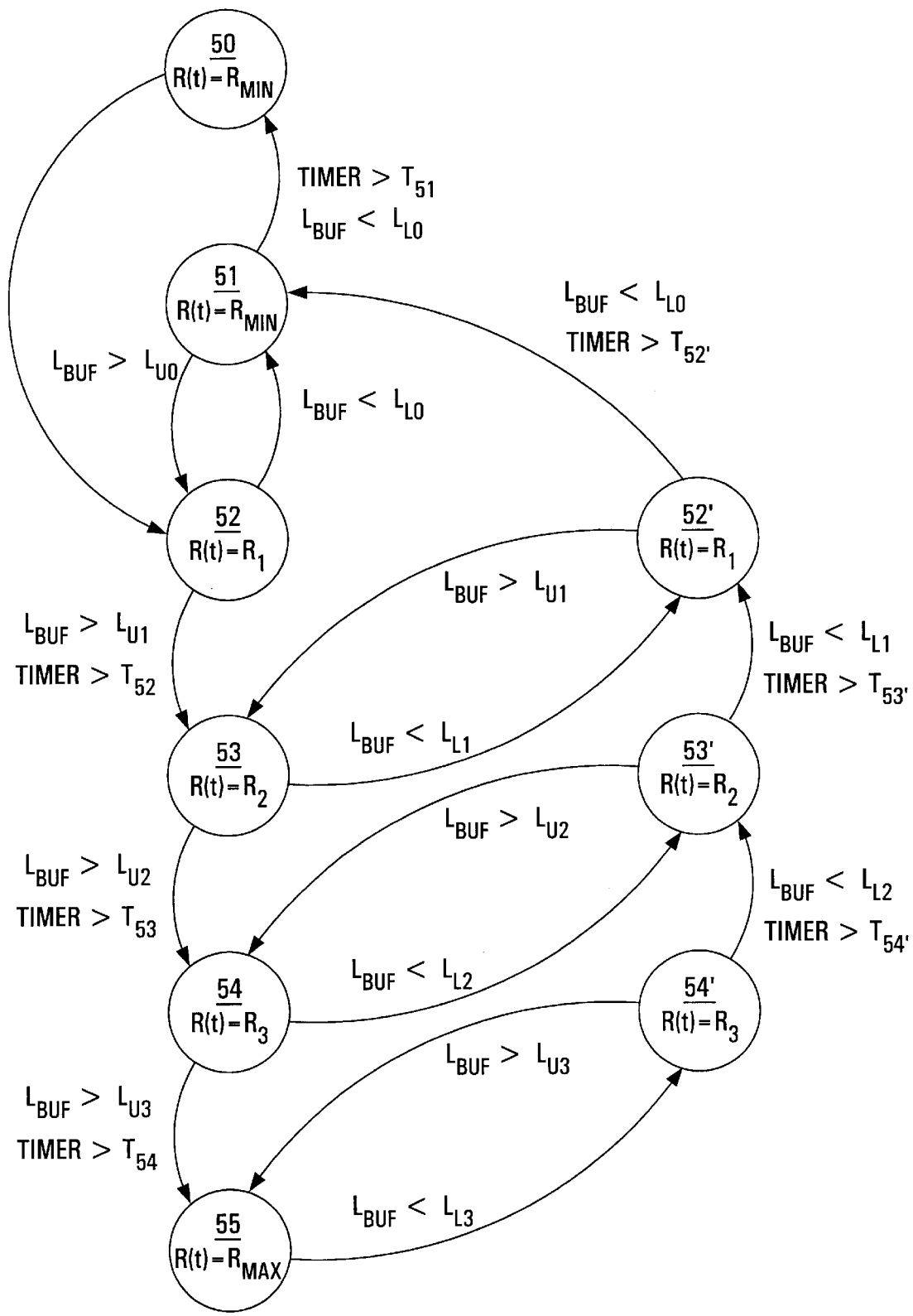
FIG. 2 is a finite-state diagram behaviourally describing the controller of FIG. 1.

Due to the close relationship between R(t) and P(t), it is sufficient to consider only generation of the desired output rate R(t) by the controller 38 as a function of the buffer occupancy level $L_{BUF}(t)$. One method of generating R(t) is now described with reference to the state diagram shown in FIG. 2. At any given time, the controller 38 finds itself in one of a number of different states (50, 51, 52, 52', 53, 53', 54, 54' and 55), each state corresponding to a particular value of the desired output rate R(t). In the state diagram of FIG. 2, the desired output rate R(t) has a value of $R_{MIN}$ (typically but not necessarily zero) in states 50 and 51, a value of $R_1 > R_{MIN}$ in states 52 and 52', a value of $R_2 > R_1$ in states 53 and 53', a value of $R_3 > R_2$ in states 54 and 54', and a value of $R_{MAX} > R_3$ in state 55.

The initial state is state 51, which is also known as an "active wait" state. In this state, the high-speed channel is occupied but very little or no data is exchanged, thus $R(t) = R_{MIN}$. Transitions between states are effected as a function of the buffer occupancy level $L_{BUF}(t)$ which, as previously described, is continuously provided by the buffer 36 to the controller 38 along control link 40. In addition, as will now be described, certain states require that a timer be started upon entry and certain transitions out of such states depend upon whether the respective timer has expired. Each of the timers used in states 51, 52, 52', 53, 53', 54 and 54' are preferably to be re-started upon entry into the corresponding state.

51: This is the initial "active wait" state of the controller. Upon entry, R(t) is set to $R_{MIN}$ and a timer is started with an expiry time of $T_{51}$ seconds. State 51 may be exited in two ways: if $L_{BUF}(t)$ becomes non-zero (or greater than a threshold occupancy level $L_{U0}$), the next state is state 52; if the timer has expired and $L_{BUF}(t)$ is equal to zero (or is below a threshold occupancy level $L_{L0}$), then the next state is state 50. In all other cases, the controller remains in state 51.

50: This state is also known as a "standby" state, in which the high-speed channel is released.

Subsequently, if $L_{BUF}(t)$ exceeds zero (or the threshold occupancy level $L_{U0}$), then the controller enters state 52. Otherwise, the high-speed channel remains released and the controller remains in state 50.

52: This state is entered when $L_{BUF}(t)$ exceeds zero (or the threshold occupancy level $L_{U0}$), at which point R(t) is set to $R_1$, the next highest data rate. At the same time, a timer is started with an expiry time of $T_{52}$ seconds. This state can be exited in two ways: if $L_{BUF}(t)$ becomes zero again (i.e., if the buffer 36 depleted) or, more generally, if it dips below the threshold occupancy level $L_{LO}$, then the controller returns to state 51. Alternatively, if $L_{BUF}(t)$ exceeds a threshold occupancy level $L_{U1}$ and if to the timer has expired, then the next state is state 53. In all other cases, the controller stays in state 52.

53: Upon entering this state, R(t) is set to $R_2$, the next highest data rate. Also, a timer with an expiry time of $T_{53}$ seconds is started. If $L_{BUF}(t)$ exceeds a threshold occupancy level $L_{U2}$ and if the timer has expired, the next state is state 54. If, on the other hand, $L_{BUF}(t)$ is less than a threshold occupancy level $L_{L1}$, the next state is state 52'. In all other cases, the controller remains in state 53.

54: Once this state is entered, a timer with an expiry time of $T_{54}$ seconds is started and R(t) is set to $R_3 > R_2$. In order to exit this state, $L_{BUF}(t)$ must either drop to below a threshold occupancy level $L_{L2}$, in which case the next state is state 53', or it must exceed a threshold occupancy level $L_{U3}$ and the timer must expire, in which case the next state is state 55. In all other cases, the controller remains in state 54.

55: When the controller enters this state, R(t) is preferably set to a rate of $R_{MAX}$, which is the maximum possible data rate of the bursty data stream. Alternatively, R(t) may be set to a value which is slightly greater than $R_{MAX}$. If $L_{BUF}(t)$ falls below a threshold occupancy level $L_{L3}$, then the next state is state 54'; otherwise, the controller remains in state 55.

54': This state is entered when the controller drops out of state 55, which provokes a reduction in R(t) to $R_3$. At the same time, a timer is started with an expiry time of $T_{54'}$ seconds. If the timer has expired and $L_{BUF}(t)$ has dropped to below the threshold occupancy level $L_{L2}$, then the next state is state 53'. However, if $L_{BUF}(t)$ increases to above the threshold occupancy level $L_{U3}$, the controller returns to state 55. In all other cases, the controller stays in state 54'.

53': This state may be entered either from state 54' (as just described) or from state 54. In either case, there is a reduction in R(t) to $R_2$ and a timer with an expiry time of $T_{53'}$ seconds is started. If $L_{BUF}(t)$ exceeds the threshold occupancy level $L_{U2}$, then the controller enters state 54, while if $L_{BUF}(t)$ falls to below the threshold occupancy level $L_{L1}$ and if the timer has expired, then the next state is state 52'.

In all other cases, the controller remains in state 53'.

52': Upon entering state 52', the controller reduces R(t) to $R_1$ and starts a timer having an expiry time of $T_{52'}$ seconds. If $L_{BUF}(t)$ rises above the threshold $L_{U1}$, then the next state is state 53; however, if $L_{BUF}(t)$ drops to zero or below the threshold occupancy level $L_{L0}$, and if the timer has expired, then the controller enters state 51. In all other cases, the controller remains in state 52'.

By virtue of the controller 38 operating as just described and by virtue of the cooperation among the various elements of the data rate smoothing unit, sudden changes in the buffer occupancy level $L_{BUF}$ result in mere gradual changes of the desired output rate R(t).

Specifically, if $L_{BUF}(t)$ increases sharply, the timers in states 52, 53 and 54 ensure that there is a lag between successive increases in the desired output rate R(t). Thus, if a burst which causes a sharp increase in $L_{BUF}(t)$ and which causes a timer to be started is relatively short in length, then $L_{BUF}(t)$ may stabilize or in fact decrease while the timer is running. When this timer expires, $L_{BUF}(t)$ may be at a level which no longer requires a further increase of R(t), advantageously resulting in smoother behaviour of the data stream withdrawn from the buffer 36 via data link 20.

Similarly, if $L_{BUF}(t)$ decreases sharply, the timers in states 52', 53' and 54' ensure that there is a lag between successive decreases in the desired output rate R(t). Thus, if a gap between bursts causes a sharp decrease in $L_{BUF}(t)$ and causes the starting of a timer but this gap lasts only for a short while, then $L_{BUF}(t)$ may increase while the timer is running. When the timer expires, $L_{BUF}(t)$ may be at a level which does not require the desired output rate R(t) to be further decreased, resulting in smoother behaviour of the data stream withdrawn from the buffer 36 along data link 20.

The amount of smoothing applied by the controller 38 and the data channel encoder 18 can be varied by providing a greater or lesser number of gradations of the desired output rate R(t) and by selecting specific values for $L_{U0}$, $L_{U1}$, $L_{U2}$, $L_{U3}$, $L_{L0}$, $L_{L1}$, $L_{L2}$, $L_{L3}$, $T_{51}$, $T_{52}$, $T_{52'}$, $T_{53}$, $T_{53'}$, $T_{54}$ and $T_{54'}$. These variables may be stored internally to the controller 38 or they may form a subset of the system parameters received from the central processing unit (not shown) along control link 34. Other system parameters or internal variables used by the controller 38 may include an identification of the power control algorithm being employed, as well as the minimum power control step size (dp), the rate at which power is controlled (1/dt), the maximum rate at which the data rate can be controlled, the mean, minimum and maximum packet sizes, the average and peak bit rates ($R_{AVG}$, $R_{MAX}$) of the bursty data stream and the delay constraints governing usage of the buffer.

The threshold buffer occupancy levels $L_{U0}$, $L_{U1}$, $L_{U2}$ and $L_{U3}$ may take on any set of increasing values, as may threshold buffer occupancy levels $L_{L0}$, $L_{L1}$, $L_{L2}$ and $L_{L3}$. For instance, suitable values of $L_{L0}$, $L_{L1}$, $L_{L2}$ and $L_{L3}$ can be calculated as follows:

$L_{L0}$: arbitrary but close to zero
$L_{L1} = L_{L0} + T_{52'} * R_1$
$L_{L2} = L_{L1} + T_{53'} * R_2$
$L_{L3} = L_{L2} + T_{54'} * R_3$.

The values of $L_{U0}$, $L_{U1}$, $L_{U2}$ and $L_{U3}$ may be similarly calculated as follows:

$L_{U0}$: arbitrary but close to zero
$L_{U1} = L_{U0} + T_{52} * R_2$
$L_{U2} = L_{U1} + T_{53} * R_3$
$L_{U3} = L_{U2} + T_{54} * R_{MAX}$.

The delay constraints of the buffer are typically specified in terms of the maximum delay that can be tolerated by the service being delivered. A first worst-case delay through the buffer 36 occurs when the bit rate of the bursty data stream jumps from $R_{MIN}$ to a prolonged burst at the maximum rate of $R_{MAX}$, causing the controller 38 to undergo state transitions from state 51 (or state 50) to state 55 via states 52, 53 and 54. The first worst-case delay through the buffer 36 can be estimated as the sum of the timer expiry times $T_{52}$, $T_{53}$ and $T_{54}$.

A second worst-case delay through the buffer 36 occurs during a prolonged gap between bursts, i.e., when the bit rate of the bursty data stream falls from $R_{MAX}$ to $R_{MIN}$ for a prolonged period of time, causing the controller 38 to undergo state transitions from state 55 to state 51 via states 54', 53' and 52'. In this case, the second worst-case delay through the buffer 36 can be estimated as the sum of the timer expiry times $T_{52'}$, $T_{53'}$ and $T_{54'}$. The overall worst-case delay is then given by the maximum of the first and second worst-case delays.

For most data transfer applications, it is usually possible to choose a set of expiry times such that the overall worst-case delay through the buffer 36 meets the delay constraints, while providing some level of interference reduction by way of smoothing the bursty data stream. It is generally the case that the more delay-sensitive an application is, the shorter the expiry times of the various timers and the fewer the states in the state diagram of the controller.

In the absence of delay constraints or assuming the delay constraints to be met, the expiry times for the timers in states 52, 53 and 54 may be calculated as follows:

$$T_{52} = \frac{K_{52}}{dp} \cdot dt + \Delta T, \text{ where } K_{52} = 10 \cdot \log\left[1 + \frac{R_1 - R_{MIN}}{R_v \cdot L}\right]$$

$$T_{53} = \frac{K_{53}}{dp} \cdot dt + \Delta T, \text{ where } K_{53} = 10 \cdot \log\left[1 + \frac{R_2 - R_1}{R_v \cdot L}\right]$$

$$T_{54} = \frac{K_{54}}{dp} \cdot dt + \Delta T, \text{ where } K_{54} = 10 \cdot \log\left[1 + \frac{R_3 - R_2}{R_v \cdot L}\right]$$

where L is the loading of the system in terms of the number of equivalent voice channels of bit rate $R_v$ and $\Delta T$ is a margin needed to account for fading, stabilization of the power levels and the position of the bursty user relative to other mobiles. The margin $\Delta T$ also serves to account for the resolution in time with which the changes in the buffer occupancy level can be measured.

Commonly, the data to be transmitted is subdivided into frames of a fixed duration and it is often not permissible to change the data rate in the middle of a frame of data. The state diagram of FIG. 2 would thus be modified to show all possible transitions out of a given state being conditional the expiry of a timer. Multiple timers may be used in a given state, one for each direction of change in R(t), and each timer would have an expiry time that coincides with the end of a frame.

Moreover, in some applications, data is not allowed to be sent to the intended recipient at a rate different from $R_{MIN}$ or $R_{MAX}$. This is generally the case with circuit-switched connections which do not ordinarily transmit bursty data. In order to achieve smoothing under such circumstances, it is nevertheless feasible to change the output rate in a step-wise fashion in accordance with the above described state diagram. However, during periods of ramping up or ramping down, dummy data may be transmitted. This leads to the actual data being somewhat more delayed than it would have been if there were no transmission of dummy data and therefore this alternate method is best suited to delay-nonsensitive applications.

Further control over the smoothing effects of the algorithm executed by the controller 38 can be achieved by further requiring that a certain amount of time elapse before increasing the output rate R(t) following a decrease in the output rate R(t) and vice-versa. In this case, the state diagram could simply be modified such that none of the states (except state 50) could be exited without the timer having expired. The various timers could have different expiry times, depending on whether the next state results in an increase or a decrease of the desired output rate R(t).

As a result of smoothing the bursty data stream, the desired power level P(t) associated with the bursty service is also smoothed. Hence, there is little degradation of service quality to other users of the system upon establishing the bursty connection and problems related to convergence of power levels across the entire system are practically eliminated. Furthermore, power amplifier requirements in the transmitter 26 may be relaxed, which can prevent outages of the high-speed link itself. Also, since there are fewer abrupt changes in the output rate, there will be fewer abrupt changes in the induced interference, leading to a higher percentage of call admissions which are retained and hence capacity is increased.

While the preferred embodiment of the present invention has been described and illustrated, it will be apparent to persons skilled in the art that numerous modifications and variations are possible. For example, the state diagram of FIG. 2 can be modified in various ways while remaining within the scope of the invention. Namely, there may be a different number of states associated with finer or coarser gradations of the desired data rate R(t) and the transitions themselves need not be restricted to adjacent states. If a significant increase or decrease in buffer occupancy is detected, it may be advantageous to jump by two or more levels of the desired output rate, although this produces less of a smooth variation in the output rate than does a transition to an adjacent state.

Furthermore, while it is preferable to send the value of the desired output rate R(t) to the intended recipient over a control channel, it is nevertheless possible to change the data rate at the transmitter without the receiver's knowledge. In such a scenario, which is best suited to a small number (e.g., three or four) of possible output rates, the receiver could perform trellis decoding of all symbol stream possibilities and apply a maximum likelihood decision-making process to the multitude of potential symbol combinations. This incurs an additional delay but may be tolerable, depending on the delay constraints and on the type of service being delivered.

Moreover, although the invention is particularly applicable to CDMA systems, it will be appreciated by those skilled in the art that any interference-limited communications system can benefit from the advantages of the invention as described herein.

Therefore, in view of the many further conceivable variations of the present invention, the scope of the latter is only to be limited by the claims appended hereto.

What claim:

1. A method of smoothing the bit rate transitions in a bursty input data stream, comprising the steps of:

(A) receiving the input data stream in a buffer;

(B) periodically measuring an occupancy level of the buffer, (C) comparing the occupancy level of the buffer to a threshold occupancy level;

(D) withdrawing the contents of the buffer at an output rate;

(E) varying the output rate as a function of the occupancy level comparison and as a function of a previous change in the output rate, thereby to produce an output data stream having smoother data rate transitions than the input data stream.

2. A method as claimed in claim 1, wherein the step of varying the output rate comprises increasing the output rate if the previous change in the output rate was a decrease and the buffer level is above the threshold occupancy level.

3. A method as claimed in claim 2, wherein the step of varying the output rate further comprises decreasing the output rate if the previous change in the output rate was an increase and the buffer occupancy level is below a second threshold occupancy level.

4. A method as claimed in claim 3, wherein the data withdrawn during an increase in output rate or a decrease in output rate is dummy data.

5. A method as claimed in claim 1, wherein the threshold occupancy level is a first threshold occupancy level and the step of varying the output rate comprises increasing the output rate if the previous change to the output rate was an increase AND a predetermined amount of time dependent on the output rate has elapsed since the previous change to the output rate AND the buffer occupancy level is above a second threshold occupancy level.

6. A method as claimed in claim 5, wherein the first and second threshold occupancy levels are dependent on the output rate and wherein for a given output rate, the first and second threshold occupancy levels are identical.-

7. A method as claimed in claim 5, wherein the predetermined amount of time is a first predetermined amount of time, and wherein the step of varying the output rate comprises decreasing the output rate if
the previous change to the output rate was a decrease AND a second predetermined amount of time dependent on the output rate has elapsed since the previous change to the output rate AND the buffer occupancy level is below a thitd threshold occupancy level dependent on the output rate.

8. A method as claimed in claim 7, wherein the first and second threshold occupancy levels are dependent on the output rate and wherein for a given output rate, the first and second threshold occupancy levels are identical.

9. A method as claimed in claim 7, wherein for a given output rate, the first and second predetermined amounts of time are identical.

10. A method as claimed in claim 7, wherein the first, second and third threshold occupancy levels are dependent on the output rate and wherein for a given output rate, the first, second, and third threshold occupancy levels are identical.

11. A method as claimed in claim 7, wherein, for a given output rate, the first and second predetermined amounts of time are dependent on sensitivity of the data in the input data stream to delay.

12. A method as claimed in claim 1, wherein the step of varying the output rate comprises decreasing the output rate if the previous change in the output rate was an increase and the buffer occupancy level is below the threshold occupancy level.

13. A method as claimed in claim 1, wherein the threshold occupancy level is a first threshold occupancy level and wherein the step of varying the output rate comprises decreasing the output rate if
the previous change to the output rate was a decrease AND a predetermined amount of time dependent on the output rate has elapsed since the previous change to the output rate AND the buffer occupancy level is below a second threshold occupancy level.

14. A method as claimed in 13, wherein the first and second threshold occupancy levels are dependent on the output rate and wherein for a given output rate, the first and second threshold occupancy levels are identical.

15. A data rate smoothing unit, comprising:
a buffer for receiving a bursty input data stream, the buffer being operable to periodically measure the occupancy level of the buffer and to compare the occupancy level of the buffer to a threshold occupancy level;
a processing unit coupled to the buffer, for withdrawing data from the buffer at a controllable output rate, thereby to produce an output data stream; and
a controller coupled to the buffer and to the processing unit, the controller being operable to vary said output rate as a function of the occupancy level comparison and as a function of a previous change in the output rate;
wherein said output data stream is less bursty than said input data stream.

16. A smoothing unit as claimed in claim 15, wherein the controller is operable to increase the output rate if the previous change in the output rate was a decrease and the occupancy level is above the threshold occupancy level.

17. A smoothing unit as claimed in claim 15, wherein the controller is operable to decrease the output rate if the previous change in the output rate was an increase and the occupancy level is below the threshold occupancy level.

18. A smoothing unit as claimed in claim 17, wherein the threshold occupancy level is a first threshold occupancy level and the controller is operable to decrease the output rate if the previous change in the output rate was an increase and the occupancy level is below a second threshold occupancy level.

19. A CDMA transmission system, comprising:
a data source for providing an input data stream comprising data bursts;
a bit rate control module connected to the data source, for receiving said input data stream, the bit rate control module being operable to periodically measure the occupancy level of the bit rate control module and compare the occupancy level to a threshold occupancy level;
a data channel encoder connected to the bit rate control module, for withdrawing an output data stream from the bit rate control module at a controllable output rate and performing error correction on the output data stream; and
a controller connected to the bit rate control module and to the data channel encoder, the controller being operable to vary said output rate as a function of the occupancy level comparison and as a function of a previous change in the output rate;
wherein said output data stream has fewer busts than said input data stream.

20. A system as claimed in claim 19, further comprising:
a transmitter connected to the data channel encoder and to the controller, for scaling the output of the data channel encoder in accordance with a controllable output power level.

21. A system as claimed in claim 20, wherein said output power level is proportional to said output rate.

22. A system as claimed in claim 20, wherein the transmitter comprises means for performing pseudo-random noise spreading of the control signal and the output of the data channel encoder, means for combining the spread signals into a composite signal, means for amplifying the composite signal and means for transmitting the amplified signal over a wireless link.

23. A system as claimed in claim 20 being part of a mobile unit.

24. A system as claimed in claim 20 being part of a base station.

25. A system as claimed in claim 19, further comprising a control channel encoder connected between the controller and the transmitter, for encoding the output rate into a control signal and for feeding the transmitter with said control signal.

26. A CDMA transmission system, comprising for each of a plurality of users, a system as claimed in claim 17.

27. A system as claimed in claim 26, further comprising:
A transmitter connected to the data channel encoder and to the controller corresponding to each user, for scaling the output of each data channel encoder in accordance with a respective controllable output power level;
wherein each controller is further operable to vary said output power level as a function of the comparing of said occupancy level to the threshold occupancy level.

28. A system as claimed in claim 27, wherein the controllers corresponding to the plurality of users are centralized.

* * * * *

UNITED STATES PATENT AND TRADEMARK OFFICE
CERTIFICATE OF CORRECTION

PATENT NO. : 6,778,499 B1
DATED : August 17, 2004
INVENTOR(S) : Nimal Senarath et al.

It is certified that error appears in the above-identified patent and that said Letters Patent is hereby corrected as shown below:

Column 10,
Line 29, replace the words "What claim:" by -- What is Claimed: --
Line 34, after the word "buffer", replace "(,)" by -- (;)---19 --

Column 11,
Line 9, replace the word "thitd" by -- third --

Column 12,
Line 26, replace the word "busts" by -- bursts --
Line 52, replace the number "17" by -- 19 --
Line 54, replace "A transmitter" by -- a transmitter --

Signed and Sealed this

Twelfth Day of April, 2005

JON W. DUDAS
*Director of the United States Patent and Trademark Office*